(12) United States Patent
Dauria et al.

(10) Patent No.: US 9,551,523 B2
(45) Date of Patent: Jan. 24, 2017

(54) METHOD FOR CONTROLLING THE DEFROST OF AN EVAPORATOR IN A REFRIGERATION APPLIANCE

(71) Applicant: Whirlpool Corporation, Benton Harbor, MI (US)

(72) Inventors: Mariagrazia Dauria, Cassinetta (IT); Davide Guatta, Cassinetta (IT); Raffaele Paganini, Cassinetta (IT); Francesco Del Bello, Cassinetta (IT); Paolo Sicher, Cassinetta (IT)

(73) Assignee: Whirlpool Corporation, Benton Harbor, MI (US)

( * ) Notice: Subject to any disclaimer, the term of this patent is extended or adjusted under 35 U.S.C. 154(b) by 331 days.

(21) Appl. No.: 14/103,907

(22) Filed: Dec. 12, 2013

(65) Prior Publication Data

US 2014/0165629 A1    Jun. 19, 2014

(30) Foreign Application Priority Data

Dec. 14, 2012  (EP) .................................... 12197310

(51) Int. Cl.
*F25B 47/02* (2006.01)
*F25D 21/00* (2006.01)
*F25D 21/06* (2006.01)

(52) U.S. Cl.
CPC ........... *F25D 21/004* (2013.01); *F25D 21/006* (2013.01); *F25B 2600/021* (2013.01); *Y02B 40/32* (2013.01)

(58) Field of Classification Search
CPC ...... F25D 21/004; F25D 21/006; F25D 21/00; F25D 21/06; Y02B 40/32; Y02B 30/741; F25B 2600/021; F25B 49/025; F25B 47/02

USPC ............................................................ 62/80
See application file for complete search history.

(56) References Cited

U.S. PATENT DOCUMENTS

| 4,578,959 A | * | 4/1986 | Alsenz | F25D 21/02 250/340 |
| 4,850,200 A | * | 7/1989 | Sugiyama | F25B 49/02 62/156 |
| 5,261,247 A | * | 11/1993 | Knezic | F25D 11/022 62/117 |
| 5,377,498 A | * | 1/1995 | Cur | F25B 40/00 62/176.6 |

(Continued)

FOREIGN PATENT DOCUMENTS

DE    19743073 A1    4/1999
EP    0031945 A2    7/1981

(Continued)

OTHER PUBLICATIONS

European Patent Application No. 12197310.1 filed Dec. 14, 2012, Applicant: Whirlpool Corporation; European Search Report mail date: Apr. 24, 2013.

*Primary Examiner* — Frantz Jules
*Assistant Examiner* — Martha Tadesse

(57) ABSTRACT

A method for controlling evaporator defrost in a refrigeration appliance having a cooling circuit with a variable cooling capacity compressor is disclosed. The method includes assessing the cooling capacity of the cooling circuit and calculating the defrost time on the basis of such cooling capacity. Defrost time is preferably assessed on the basis of the inverter frequency driving the compressor and/or the percentage of insertion of the compressor.

13 Claims, 1 Drawing Sheet

(56) References Cited

U.S. PATENT DOCUMENTS

| | | | | |
|---|---|---|---|---|
| 5,533,350 A | * | 7/1996 | Gromala | F25D 21/006 62/154 |
| 5,628,199 A | * | 5/1997 | Hoglund | F25B 49/02 62/127 |
| 2005/0241324 A1 | * | 11/2005 | Cho | F25D 21/006 62/150 |
| 2007/0209376 A1 | * | 9/2007 | Boer | F25D 21/006 62/155 |
| 2010/0126191 A1 | * | 5/2010 | Han | F25D 21/02 62/80 |
| 2013/0081416 A1 | * | 4/2013 | Kim | F25D 21/006 62/151 |

FOREIGN PATENT DOCUMENTS

| | | |
|---|---|---|
| EP | 1591736 A1 | 11/2005 |
| EP | 1619456 A1 | 1/2006 |

\* cited by examiner

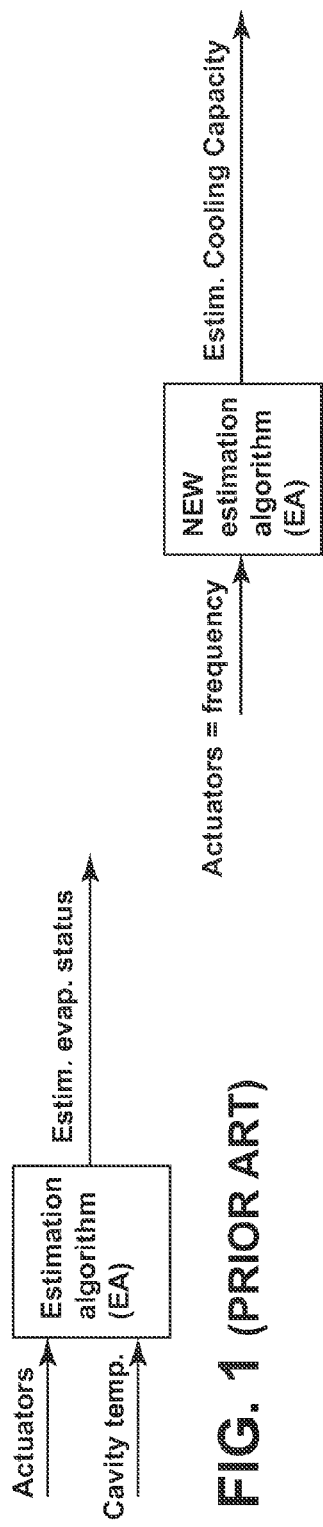
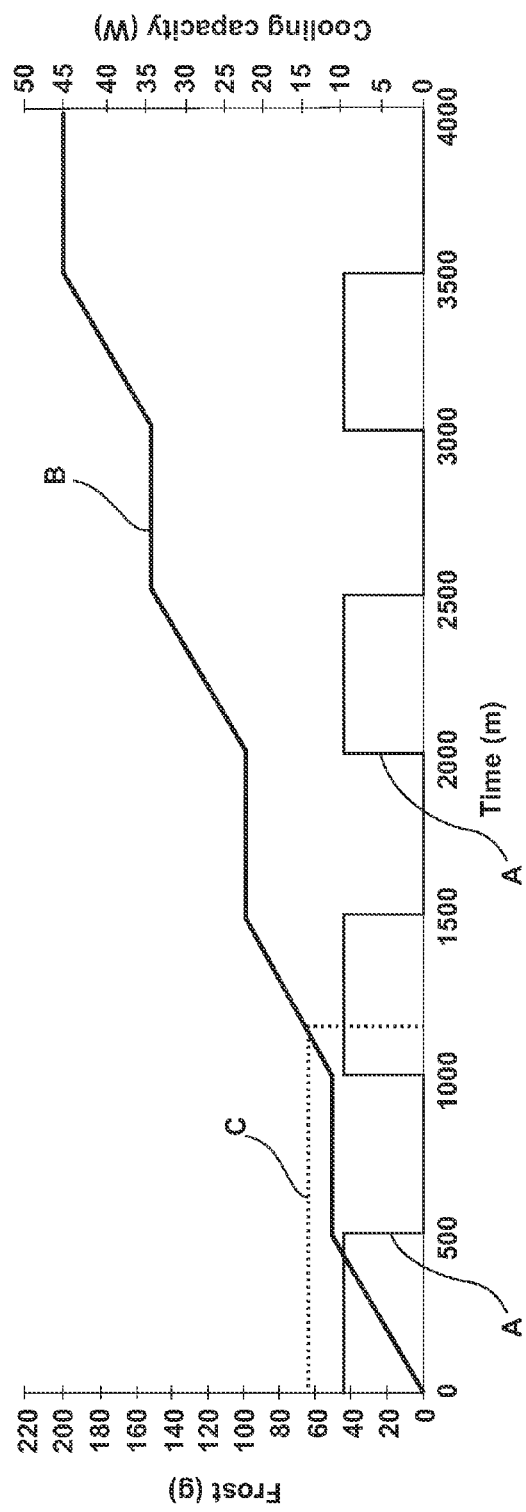

METHOD FOR CONTROLLING THE DEFROST OF AN EVAPORATOR IN A REFRIGERATION APPLIANCE

CROSS REFERENCE TO RELATED APPLICATION

This application claims priority to EP 12197310.1, filed on Dec. 14, 2012, entitled "Method for controlling the defrost of an evaporator in a refrigeration appliance," the disclosure of which is hereby incorporated herein by reference in its entirety.

BACKGROUND OF THE DISCLOSURE

The present invention relates to a method for controlling the defrost of an evaporator in a refrigeration appliance having a cooling circuit with a variable cooling capacity compressor. The present invention relates as well to a refrigeration appliance having a cooling circuit with a variable cooling capacity compressor and a control unit for driving said compressor.

With the term "variable cooling capacity compressor" it is meant every kind of compressor having a control unit adapted to adjust the cooling capacity thereof. Even if the term applies generally to compressors having a variable speed motor according to the different frequencies of the inverter system driving the compressor, the term applies to on/off compressors as well, in which the cooling capacity control is carried out by adjusting the percentage of compressor insertion.

EP1619456 discloses an algorithm allowing estimation of one or more thermodynamic parameters from one or more thermodynamic or electrical parameters of cooling system circuits in which a cell temperature is used for feeding an estimating algorithm which can control the compressor.

The control process disclosed by EP1619456 can be sketched as shown in FIG. 1, in which a couple of inputs to the control system are required, i.e. an input from one of the actuators and an input form a temperature sensor. This approach is quite complex and therefore the overall cost of the control system is high.

Currently no estimation is made on cooling circuit, and only heat exchanger measurements are available. Therefore current adaptive defrost algorithms cannot take in account the effect of variable cooling capacity supplied by the compressor into the frost creation process. The known algorithm make the assumption that frost generation is constant in respect of compressor run time. In the variable cooling capacity compressor this is not the case. A system control, taking advantage of variable cooling capacity compressor, could select cooling capacities lower than maximum values allowed. This would cause the frost creation process to be slower than the frost generated by a single speed compressor driven in the same way. An algorithm that doesn't take into account this factor tends to estimate the needing of a defrost procedure more frequently than necessary. This results in lowered performances.

One object of the present invention is to provide a method for controlling defrost of an evaporator which is highly reliable and needs few component or sensors. Another object is to provide a method which is particularly useful for controlling the defrost timing in refrigerators using variable cooling capacity compressors. Another object is to provide an algorithm that avoids an overestimation of frost buildup, particularly when a variable cooling capacity compressor is used.

The above objects are reached thanks to the features listed in the appended claims.

SUMMARY OF THE DISCLOSURE

According to the invention, it is needed one input only to the algorithm, and preferably such input is the frequency of the inverter driving the compressor.

The algorithm according to the invention allows to estimate the cooling capacity of the cooling system circuit (and therefore the defrost time) from an electric parameter, particularly from the inverter frequency driving the compressor and/or the percentage of compressor insertion. The above estimation can be used to improve control logic, to replace existing sensors or to implement new functionalities. This estimation is used to extend any previously known adaptive defrost algorithms to the variable cooling capacity compressor case. This extension is implemented as a translation layer, which is interposed between the cooling capacity estimator and the previous adaptive defrost algorithm. The main advantage of the algorithm according to the invention is that it allows to extend to the variable speed compressor case the same existing adaptive defrost algorithms and its particular appliance calibration without any change. The use of this algorithm leads to higher performances in terms of time between two defrost procedures without impacting energy label of the appliance.

Further features and advantages of a method according to the invention will become clear from the following detailed description, provided as an example, with reference to the attached drawings.

BRIEF DESCRIPTION OF THE DRAWINGS

FIG. 1 is a schematic view of a control process according to prior art;

FIG. 2 is a schematic view similar to FIG. 1 in which a control process according to the present invention is shown; and FIG. 3 show how the frost generation process is controlled in a refrigerator using a variable cooling capacity compressor and a control algorithm according to the invention.

DETAILED DESCRIPTION OF THE EMBODIMENTS

The control algorithm according to the invention starts from the idea that the cooling capacity (CC) is a function of inverter motor frequency driving the compressor (freq), temperature of the evaporator ($T_{evap}$) and temperature of condenser ($T_{cond}$):

$$CC = f(\text{freq}, T_{evap}, T_{cond})$$

The most important variable in the above relationship is the frequency. So, as first approximation, we can consider:

$$CC \sim f(\text{freq})$$

According to very general conditions (that we can assume being satisfied without loss of generality of the consequences), it is known that a function can be represented by a Taylor series:

$$CC = f(\text{freq}) = \Sigma_{h=0}^{\infty} A_h \cdot \text{freq}^h$$

Where h is the sum index (non negative integer) and the $A_h$ are constants that can be analytically evaluated by $$A_h = \frac{1}{h!} \frac{d^h CC}{d\,freq^h}\bigg|_{freq=0}$$

if the function CC=f(freq) is known.

It is also known that a function satisfying that assumption can be approximated by the first N terms of the series (where N determines the error of the approximation). In particular, we assume N=1

$$CC = f(\text{freq}) \sim \Sigma_{h=0}^{N} A_h \cdot \text{freq}^h \sim A_0 + A_1 \cdot \text{freq}$$

$A_0$ and $A_1$ can be both analytically and experimentally evaluated . . . . That is:

$$CC \sim A_0 + A_1 \cdot \text{freq}$$

Then, the first and most important point is that this approach is able to reduce the number of the inputs to the algorithm.

Applying the concept to defrost operation, where the target is to estimate ice formation over the evaporator, the solution according to the invention is based on the general principle:

$$ice \propto \overline{CC} = \frac{1}{T}\int CC dt \sim A_0 + A_1 \cdot \overline{freq}$$

Where:

$$\overline{CC} = CC_{mean} = \frac{1}{T}\int CC dt$$

$$\overline{freq} = freq_{mean} = \frac{1}{T}\int freq dt$$

The average cooling capacity and the average frequency are evaluated, respectively, over the time span T. This relationship works for variable cooling capacity compressor and single speed compressor as well. It is clear that, by using the frequency as input, it works in case of variable cooling capacity compressor, where variable frequency is the main control parameter. Let's see how it works and how it could be modified in case of single speed compressor.

In case of single speed compressor, in fact, constant input frequency is equal to:

$$\overline{freq} = \frac{1}{T}\int freq dt = \frac{freq_0}{T}\int \text{Comp\_OnOff} dt = \text{Insertion} * freq_0$$

Where:
"Insertion" stands for the time fraction during which the compressor is ON (time fraction respect on T);
"$freq_0$" is the only working frequency of the single speed compressor.

Then, the formula can be simplified in:

$$ice \propto \overline{CC} = A_0 + k_1 \cdot \text{insertion}$$

where:

$$k_1 = A_1 \cdot freq_0$$

With reference to FIG. 3, with A it is indicated the cooling capacity (right Y axis, in Watt), with B the total frost generated (left Y axis, in gram), with C the defrost threshold according to the algorithm of the invention, on the X axis time (in minutes) being reported.

The control approach according to the invention is an improvement also because it extends the approach based on ice $\propto \overline{CC} = A_0 + k_1 \cdot$ insertion that works only in case of single speed compressor to a new class of compressor (variable speed compressors or variable cooling capacity compressors) by the formula ice $\propto \overline{CC} \sim A_0 + A_1 \cdot \overline{freq}$.

The invention claimed is:

1. A method for controlling a defrost of an evaporator in a refrigerator comprising:
   providing a refrigerator comprising a cooling circuit with a variable cooling capacity compressor;
   assessing an average cooling capacity of the cooling circuit over a predetermined time period based on inverter frequency driving the compressor, a percentage of insertion of the compressor, or both the inverter frequency driving the compressor and the percentage of insertion of the compressor;
   calculating a defrost initiation time on a basis of the average cooling capacity; and
   initiating a defrost of the evaporator based in part on the calculated defrost initiation time;
   wherein the step of assessing cooling capacity is assessed according to the following formula:

$$CC = f(\text{freq}) \sim A_0 + A_1 \cdot \text{freq}$$

where
   freq is the frequency of the inverter driving the compressor, and
   A0 and A1 are experimental constants.

2. The method according to claim 1, wherein the step of calculating the defrost initiation time is calculated proportional to an amount of ice accumulated on the evaporator.

3. A refrigerator comprising:
   a cooling circuit with a variable cooling capacity compressor; and
   a control unit for driving the compressor;
   wherein the control unit is adapted to assess a cooling capacity of the cooling circuit over a predetermined time period, to calculate a defrost initiation time on a basis of such cooling capacity, and to initiate a defrost procedure based in part on the calculated defrost initiation time;
   wherein the control unit is adapted to assess cooling capacity on a basis of an inverter frequency driving the compressor, or a percentage of insertion of the compressor, or both the inverter frequency driving the compressor and the percentage of insertion of the compressor; and
   wherein the cooling capacity is assessed according to the following formula:

$$CC = f(\text{freq}) \sim A_0 + A_1 \cdot \text{freq}$$

where:
   freq is the frequency of the inverter driving the compressor, and
   A0 and A1 are experimental constants.

4. The refrigerator according to claim 3, wherein the defrost initiation time is calculated proportional to an amount of ice accumulated on an evaporator.

5. A method for controlling a defrost of an evaporator in a refrigerator comprising:
   providing a refrigerator comprising a cooling circuit with a variable cooling capacity compressor driven by an inverter motor;

assessing an average inverter motor frequency over a predetermined time period;
predicting ice formation over the evaporator based in part on the average inverter motor frequency; and
initiating a defrost procedure of the evaporator based in part on the predicted ice formation exceeding a predetermined threshold;
wherein the step of assessing the average inverter motor frequency is assessed according to the following formula:

$$\overline{freq} = freq_{mean} = 1/T \int freq\, dt$$

where:
freq is the frequency of the inverter driving the compressor, and
T is a predetermined time period.

6. The method according to claim 5, wherein the step of predicting the ice formation over the evaporator is predicted according to the following formula:

$$ice \propto A_0 + A_1 \cdot \overline{freq}$$

where:
freq is the frequency of the inverter driving the compressor,
A0 and A1 are experimental constants; and
T is a predetermined time period.

7. The method according to claim 5, wherein the step of predicting the ice formation is calculated proportional to an amount of ice accumulated on the evaporator.

8. The method according to claim 5, wherein the step of assessing the average inverter motor frequency over a predetermined time period is based on both the inverter frequency driving the compressor and a percentage of insertion of the compressor.

9. The method according to claim 1, wherein the step of assessing the average cooling capacity is based on a temperature measurement of the evaporator and a temperature measurement of a condenser.

10. The refrigerator according to claim 3, wherein the control unit is adapted to assess cooling capacity based on a temperature measurement of an evaporator and a temperature measurement of a condenser.

11. The method according to claim 5, wherein the step of predicting the ice formation over the evaporator is based in part on a temperature measurement of the evaporator and a temperature measurement of a condenser.

12. The method according to claim 1, wherein A0 and A1 experimental constants are appliance calibration constants for the refrigerator.

13. The refrigerator according to claim 3, wherein A0 and A1 experimental constants are appliance calibration constants for the refrigerator.

* * * * *